United States Patent
Genser (10) Patent No.: US 7,150,807 B2
(45) Date of Patent: Dec. 19, 2006

(54) ROTARY EVAPORATION WITH VARIABLE DOSAGE METERING

(76) Inventor: Hans Georg Genser, Bolleinsmuhle, D-91639 Wolframs-Eschenbach (DE)

( * ) Notice: Subject to any disclaimer, the term of this patent is extended or adjusted under 35 U.S.C. 154(b) by 377 days.

(21) Appl. No.: 10/189,707

(22) Filed: Jul. 3, 2002

(65) Prior Publication Data
US 2003/0111185 A1   Jun. 19, 2003

(30) Foreign Application Priority Data
Jul. 5, 2001   (DE) ............... 101 32 637

(51) Int. Cl.
B01D 1/22 (2006.01)
B01D 3/42 (2006.01)

(52) U.S. Cl. ............ 159/6.1; 159/44; 159/47.1; 159/DIG. 4; 202/238

(58) Field of Classification Search ............ 159/6.1, 159/44, 47.1, DIG. 4; 202/238; 203/1, DIG. 18
See application file for complete search history.

(56) References Cited

U.S. PATENT DOCUMENTS

| | | | |
|---|---|---|---|
| 4,036,865 A * | 7/1977 | Hartmann et al. | 554/205 |
| 4,738,295 A * | 4/1988 | Genser | 159/6.1 |
| 5,053,111 A * | 10/1991 | Ellerbe, Jr. | 203/1 |
| 5,746,241 A * | 5/1998 | Stedman | 137/101.21 |
| 5,753,508 A * | 5/1998 | Robertson et al. | 436/2 |
| 5,833,893 A * | 11/1998 | Jones et al. | 264/13 |
| 6,063,242 A * | 5/2000 | Hauser | 202/505 |
| 6,802,941 B1 * | 10/2004 | Zebuhr | 202/155 |

FOREIGN PATENT DOCUMENTS

| | | |
|---|---|---|
| DE | 35 26 644 A1 | 1/1987 |
| DE | 35 11981 C2 | 10/1987 |
| DE | 43 19 498 A1 | 11/1994 |
| JP | 59090602 A | 5/1984 |

* cited by examiner

Primary Examiner—Virginia Manoharan
(74) Attorney, Agent, or Firm—Pearne & Gordon LLP (57) ABSTRACT

Method and system for evaporating at least one substance. During at least one dosing phase (TG) a predefined or predefinable quantity of a product (M) which contains at least one substance to be evaporated is imported via a feed system (7, 14, 17, 33, 36) into a revolving vessel (2). The revolving vessel is rotated around an axis of rotation (R) and appropriate process conditions for the evaporation of at least one substance are generated or maintained. The flow (F) of the product (M) is automatically controlled or regulated by the feed system (14, 17) during the dosing phase (TG) in particular as a function of at least one process parameter and/or of at least one characteristic property of the product. The product (M) is imported into the revolving vessel (2) in the course of the dosing phase only during predefined feed periods (t1, t2) that are interrupted by intervening intervals and especially idle intervals (t1, t2). The flow or imported quantity of the product is less during the intervening intervals by at least a factor of 10 and preferably at least by a factor of 20 than during the feed periods and is essentially zero during the idle intervals. The time duration of the feed periods and/or of the intervening intervals is or can be modified during the dosing phase.

18 Claims, 3 Drawing Sheets

ROTARY EVAPORATION WITH VARIABLE DOSAGE METERING

BACKGROUND OF THE INVENTION

This invention relates to a method and a system for evaporating at least one substance.

There have been prior-art systems, referred to as rotary evaporators, serving for the evaporation of substances and especially of solvents in the process of concentrating or distilling pharmaceutical or chemical products. In these prior-art rotary evaporators the liquid substances to be evaporated are introduced into the interior space of a rotating flask (evaporating vessel) typically designed to rotate within a thermal bath. As the rotating flask revolves, a thin film of liquid forms on the inside of the rotating flask from which film the substances, in particular the solvent, will then evaporate. A certain amount of the substance, i.e. of the solvent, also evaporates directly from the surface level of the liquid in the rotating flask. From the rotating flask the vapor travels through a vapor conduit toward a condenser where it is reprecipitated by condensation. It is also a common practice to generate a negative pressure or vacuum in the rotating flask for the purpose of increasing the vapor pressure of the substances to be evaporated and to preserve the product. In one transition area the vapor conduit is connected to the rotating flask via a rotatable junction. That junction is sealed by means of a rotary gasket.

Disclosed in the German patent (DE) 1.224.062 is a rotary evaporator incorporating an operating flask that can be rotated around its axis of symmetry by a motorized drive unit. The operating flask can also pivot freely around a swivel pin that extends in a direction perpendicular to that axis of symmetry as it floats freely on the surface of a water bath. In a rotary evaporator incorporating that type of pendulum suspension the weight of the operating flask is thus counterbalanced only by the buoyancy of the operating flask in the water bath, which substantially reduces the torque and the forces bearing on the mount of the operating flask. The glass adapter which, together with the operating flask attached to it, can be rotated via the rotary drive, is sealed by an O-ring gasket against another, non-rotating glass adapter that is connected to the enclosure. Inserted in the stationary glass adapter on the far side from the rotary glass adapter is an inlet and scrub nozzle equipped with a two-way cock and a hose fitting for the intake of fresh liquid, as well as an offtake by way of which a scavenging fluid can be sprayed against the inner walls of the glass adapters to flush out condensation in these glass adapters.

DE 35 11 981 C2 describes a method for rotational vacuum evaporation as well as a system for implementing that method. That earlier rotary evaporator incorporates a pendulum suspension whereby a freely buoyant rotating flask floats on or in a liquid bath. The level at which the rotating flask floats relative to the surface level of the liquid in the liquid bath is measured directly or indirectly by means of a measuring device, providing an autoleveling variable within a regulating range or an actuating variable within a control range for the purpose of regulating or controlling the amount contained in the rotating flask. The height position of the rotating flask relative to the top surface level of the liquid provides a direct measure of the fill contained in the rotating flask, i.e. of the amount of liquid in the rotating flask.

That height position and thus the content of the rotating flask is determined by the amount of piped-in liquid to be evaporated which thus serves as the control parameter. A solenoid valve serves as the regulating device for opening and closing the feed of the substance to be evaporated and its opening and closing action is correspondingly controlled by a regulator, thus ensuring at all times an adequate quantity of the substance to be processed in the rotating flask so as to keep most of the inner surface of the latter coated with the substance as the flask rotates. The rotary evaporator thus operates at a high level of efficiency.

When the desired degree of thickening or concentration of the unevaporated product remaining in the rotating flask is reached, the evaporation process is shut off. If due to the evaporation the relative density i.e. volume weight of the concentrate remaining in the rotating flask has increased as for instance when concentrating a saline solution, the default setting for the height position of the rotating flask is automatically and incrementally adjusted as the volume weight of the content of the rotating flask increases. In this fashion the content, i.e. the volume of the substance in the rotating flask, is held at a constant level in spite of its progressively augmented relative density. The incremental adjustment of the setpoint value for the height position of the rotating flask can always begin with a new evaporation process for a newly filled rotating flask either as part of a series of repetitions or, alternatively, during a continuous evaporation process involving multiple metering steps for replenishing the content of the flask. Thus, in order to keep the volume of the density-gaining product constant, a somewhat larger amount of the substance is added in each progressive refilling or metered replenishing step than in the preceding refilling or metered replenishing step.

In other words, in the case of that prior-art rotary evaporator described in DE 35 11 981 C2 the content or volume of the product in the rotating flask is regulated by time-spaced metering steps or intake phases, with the dosage increasing with every step. During a metered dispensing step the solenoid valve is completely open, permitting an essentially constant product volume flow into the rotating flask. The amount of the substance added is controlled during the time in which the solenoid valve stays open. The metered dispensing step is terminated by closing the solenoid valve.

According to DE 35 22 607 A1 which is an application supplementary to DE 35 11 981 C2, the volume content of the rotating flask, or any change of that volume content reflected by the degree of immersion of the rotating flask in the bath liquid, is determined by weighing and the result of the weighing serves as the regulating or control parameter for the evaporation process. The rotating flask is kept floating by its buoyancy on or in a liquid bath in particular by virtue of a pendulum suspension or a linear raising and lowering system. As the means for controlling the evaporation process, DE 35 22 607 A1 merely mentions a regulated product feed, referring to the older DE 35 11 981 C2. The product feed takes place via a product intake valve which is opened when the rotating flask is to be filled, and closed before the evaporation process begins.

DE 43 19 498 A1 describes a rotary evaporator with a revolving vessel that is pivot-mounted along an oblique axis of rotation, and with an intake for feeding the substance to be evaporated into the revolving vessel, an offtake for removing vapor from the vessel, as well as a microwave heater for heating the evaporation substance in the revolving vessel. The feed line for the substance to be evaporated is equipped with a pump whose throughput capacity is adjustable. The feed is said to be continuous.

DE 35 96 644 A1 describes another rotary evaporator in which the metered addition of the sample solution into the rotating flask is automatically controlled via a sample metering vessel. The sample solution is moved from a storage container into the metering vessel for interim storage and subsequent release into the rotating flask. This allows for the sample solution, or the substance to be evaporated, to be fed to the rotating flask in specific, fixed, predetermined quantities. Interpositioned between the storage container and the sample metering vessel and again between the sample metering vessel and the rotating flask is a line with a processor-controlled valve serving to control the metered addition of the product into the rotating flask.

Another rotary evaporator is discussed in Patent Abstracts of Japan No. 590 90 602 A in which the amount of sample liquid contained in the rotating flask is controlled to a specific fill level or a specific volume with the aid of a sensor. When the fill level detected by the sensor drops below setpoint, an electromagnetically operated valve continuously meters out fresh sample liquid during a replenishment phase until the required fill level is restored.

In all of the prior-art rotary evaporators described above, the amount of product added during a dosing phase, i.e. the replenishment rate or product flow, is constant per unit of time. For certain products it is necessary, however, to have the ability to operate at a slower replenishment i.e. reduced flow rate per unit of time in comparison with other products so as to prevent a negative impact on the process. Examples of such problematic products include high-foaming or outgassing products, for instance some of the polymers or peptides. If one were to select the diameter of the inlet valves in these prior-art rotary evaporators small enough to suitably reduce the feed rate of these critical products, it would affect the throughput and thus the productivity of the process when other, less critical products are to be handled.

BRIEF SUMMARY OF THE INVENTION

It is the objective of this invention to introduce a method and a system for evaporating at least one substance in a manner whereby the above-mentioned shortcomings of prior-art systems are at least in part eliminated or at least minimized.

This objective is achieved by the present invention.

In accordance with one aspect, the present invention provides a method for evaporating at least one substance includes the following procedural steps:

a) Introduction of a predefined or predefinable (fixed or variable) quantity of a material (or product) which contains, or consists of, a substance to be evaporated, in a revolving vessel (or working vessel) during a dosing phase, in the process of which the flow or quantity flow i.e. the quantity per unit of time or the flow rate of the product introduced during the dosing phase is automatically modified or modifiable especially as a function of the prevailing process conditions and/or of at least one characteristic property of the product, whereby during the intake phase the product is imported into the revolving vessel only at predefined times that are interrupted (or mutually separated) by intervening intervals and especially idle intervals, the duration of the said feed periods and/or intervening intervals and especially of the idle intervals being modified or modifiable during the dosing phase.

b) Rotation (turning) of the revolving vessel around an axis of rotation (center of rotation).

c) Creation of process conditions suitable for the evaporation of at least one substance, in particular the necessary process pressures and process temperatures.

Evidently, steps a) through c) may be executed in any desired order or even simultaneously. During the intervening intervals the maximum flow or feed rate of the product is typically 0.1 times or preferably no more than 0.05 times the flow or volume during the feed periods. During the idle intervals as a special form of intervening intervals, the flow and volume are virtually zero, i.e. the metered addition is at "idle".

The system of one aspect for evaporating at least one substance comprises a) a revolving vessel for accepting a product that contains, or consists of, at least one substance to be evaporated, and b) a drive unit for rotating the revolving vessel around an axis of rotation, as well as c) a feed system for feeding the product into the revolving vessel.

The feed system is so designed that during a dosing phase said feed system supplies a predefined or predefinable total quantity of the product while the flow is modifiable or adjustable especially as a function of at least one current process parameter and/or at least one characteristic property of the product. During the intake phase the feed system supplies the product to the revolving vessel only at predefined times that are interrupted or mutually separated by intervening intervals and especially idle intervals, the duration of the said feed periods and/or intervening intervals or idle intervals being modified or modifiable during the dosing phase. The flow or volume of the product is larger during the feed periods than during the intervening intervals, in particular by a factor of at least 10 and preferably by a factor of at least 20. During the idle intervals the flow is essentially zero.

The evaporating system according to the invention is preferably employed for implementing a method per the invention.

The term evaporation is intended to include all processes in which a substance transitions from a nongaseous or nonvaporous state into a gas or vapor phase, thus including in particular the evaporation of a liquid into vapor in more specific terms but also the melting and subsequent vaporization or sublimation of a solid substance into vapor. The method and the system for evaporating at least one substance can therefore also be referred to as a method and system for the transformation of at least one nongaseous substance into the gas or vapor phase.

The quantity of the product flowing into the revolving vessel (i.e., quantity flow) can be expressed by different denominators, especially the mass (or weight) of the product, the volume of the product or even the number of particles or drops of the product being introduced.

This invention is based on a concept whereby the product to be processed is dosed into the rotary evaporator automatically and in controlled fashion while permitting the dispensing rate to be adapted to the nature of the product or of the process. The product is imported in a pulsed mode, meaning that during the dosing phase the product is advanced to the revolving vessel only at predefined time lengths interrupted by intervening or idle intervals. This is easily accomplished by alternately opening and closing or partly obturating a valve. Changing the flow rate of is accomplished by changing the pulse length and/or the duration of the intervening or idle intervals between the pulses.

This type of controlled dosing is quite flexible and can be easily realized or implemented by means of numerical controls and/or electronic controllers including microprocessors or computers. It follows that in the case of problem products or during a difficult phase (condition) within the dosing phase the average flow rate can be reduced while for less problematic products or operating conditions it can be increased again for an augmented throughput or to make economically practical processing of the product possible in the first place.

In particular, the following process variables (or process factors, process parameters) or characteristic properties of the liquid or product can be factored and preferably automated into the self-regulating settings or adjustments to the time-based flow pattern of the product during the dosing operation:

Foaming of the product in the revolving vessel
Product viscosity
Product temperature
Rotational speed of the revolving vessel, or
Pressure in the revolving vessel, or system vacuum The ability to control the flow or dosing rate of the product is particularly advantageous in the case of foaming or outgassing products.

Additional advantageous forms of implementation or enhancements of the method and of the system according to this invention are specified in the subclaims.

The timing pattern of the product flow may be essentially the same for all feed periods. However, these product flow patterns may also differ from one another in at least two feed periods. The flow is preferably held essentially constant for at least one feed period throughout its duration.

Moreover, the product quantities introduced during the feed pulses may differ from one another in at least two feed periods.

Similarly, at least two feed periods may differ in duration or they may be essentially the same.

The intervening intervals between the feed periods may again be essentially identical in duration or they may at least in part differ from one another.

A modification of the dosing rate is also achievable in particular by changing the pulse height of the metering pulses.

In a special design implementation it is still possible to change the product flow timing pattern during the dosing phase, in which case the duration of the dosing phase itself may be extended or shortened. Even in the case of consecutive dosing phases the timing pattern may be modified or different patterns may be selected.

In an enhanced embodiment, the total product volume contained in the revolving vessel can be determined or measured, allowing the product quantity advanced during a dosing phase to be controlled as a function of that total product volume.

The product quantity fed to the revolving vessel during a specified time period can be calculated through a time-based summation or integration of the flow.

When, in a design employing a pendulum suspension, the revolving vessel can pivot around a swivel pin, the pivoting angle of the revolving vessel relative to a reference position can be used as a measure for determining the total product quantity to be supplied during an a dosing phase.

It is desirable to detect any foaming in the revolving vessel and to control or adjust the flow during the dosing phase on the basis of the degree of foam formation, thus making it possible to optimally evaporate foaming products as well. In that case the product feed is controlled in a way as to minimize foaming while at the same time permitting the homogeneous formation of a product film over as large an area as possible.

The revolving vessel is typically rotated in a thermal bath and heated up to the temperature needed for evaporating the respective substance(s) concerned.

The feed system serving to feed the product into the revolving vessel preferably includes at least one controllable valve or a closing, blocking or obturating mechanism as well as a control device for controlling the valve or closing mechanism.

The valve may be controllable by pneumatic, electrical and/or electromagnetic means. In a desirable design version the valve can be controlled between at least two discrete states with different flow patterns and especially simply between a closed state and an open state. However, the valve may also be controllable to be continuously adjustable between two specific flow diameters. In particular, the valve may be a proportional-action valve.

In a special design version, the feed system additionally includes a throttle valve connected in series with the controllable valve and featuring a fixed or adjustable opening width, and/or perhaps a product conveyance such as a pump.

BRIEF DESCRIPTION OF THE DRAWINGS

The following will explain this invention in more detail on the basis of implementation examples, with reference to the attached drawings in which:

In FIGS. 1 to 4, identical components and parameters bear identical reference numbers.

DETAILED DESCRIPTION OF THE INVENTION

Figure 1:
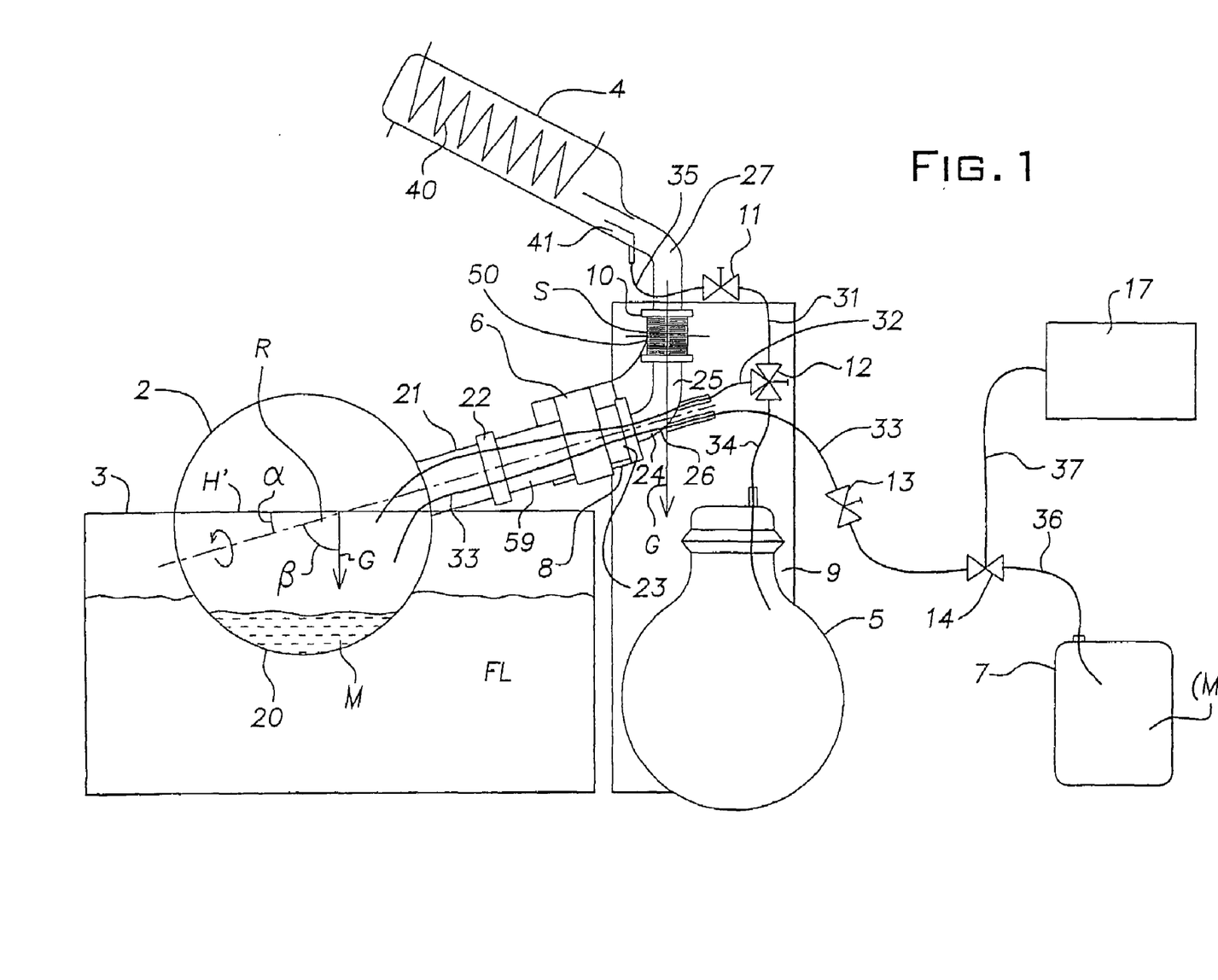
FIG. 1 is a schematic front view of a rotary evaporator according to the invention, equipped with a feed system.
Figure 2:
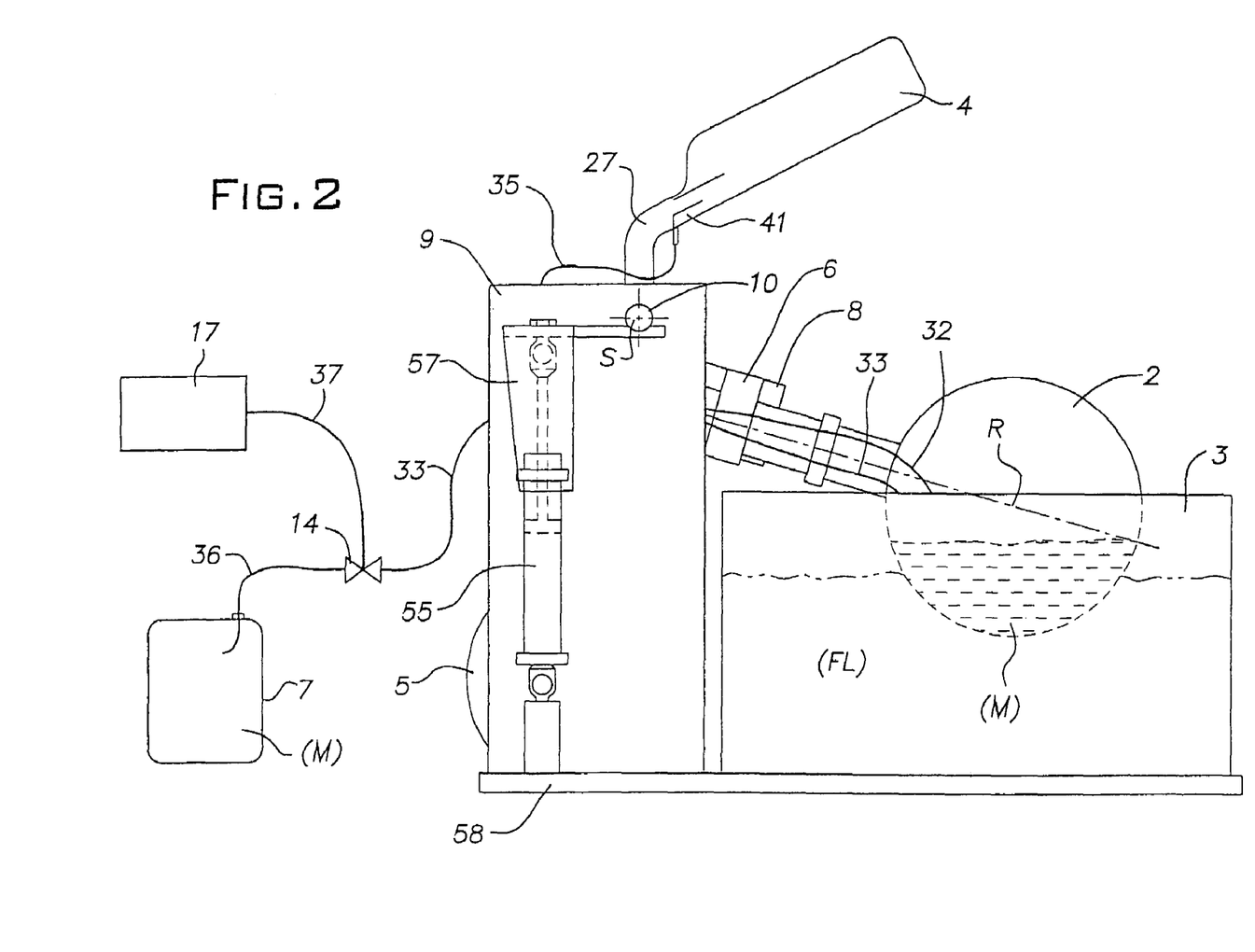
FIG. 2 is a schematic rear view of the rotary evaporator per FIG. 1.

The rotary evaporator per FIG. 1 and FIG. 2 encompasses a revolving vessel (or working vessel or rotating flask) 2 which can be rotated (turned) by means of a drive system 6 around an axis of rotation R (center of rotation) and in which the substance(s) to be evaporated can be introduced. The revolving vessel 2 per FIGS. 1 and 2 is preferably designed to be rotationally symmetrical to the axis of rotation R as the axis of symmetry, making it, when empty, rotatable around its main axis of inertia without any imbalance. The revolving vessel 2 includes an essentially spherical receptacle 20 designed to hold a product M containing liquid or particulate substance(s) to be evaporated, and, extending from an opening in the spherical receptacle 20, a neck 21 which by way of a flange 22 connects to a sleeve-type shaft 59 that is or can be rotated by the drive system 6.

For rotating the revolving vessel 2, the drive system 6 includes an electric drive unit or motor, not illustrated, and a gear unit that is coupled to the drive unit or motor. The rotational speed of the drive unit or motor can preferably be controlled or regulated.

Positioned at the other end of the drive system 6 is a stationary i.e. nonrotating intake assembly 23 which encompasses and supports a conduit 26 for exhausting the gaseous evaporated substance(s). The sleeve-type shaft 59 that connects to the neck 21 of the revolving receptacle 20 is sealed against the nonrotating conduit 26 by means of a rotary gasket mounted in the intake assembly 23.

The drive system 6 and the intake assembly 23 with the conduit 26 attached to it are mounted and held in place on a housing 8 whose swivel arm (swiveling range) extends upward roughly following the curvature of the conduit 26 and is supported in a swivel mount 10 so as to permit rotation around a horizontal pivot S.

The swivel mount 10 is retained by a support bracket 9 and preferably encompasses a pivot pin that extends between two antifriction bearing segments, preferably ball bearings located on both sides of the columnar support bracket 9, coaxially with the (geometric) pivot axis S.

The conduit 26 includes a conduit section 24 that essentially extends coaxially with the axis of rotation R, and a second conduit section 25 that essentially extends in a vertical direction parallel to the gravitational vector G. The two conduit sections are connected via an elbow and describe between them an obtuse angle greater than 90°, for instance 100°. The vertical section 25 of the conduit 16 opens into a bellows-type compensating element 50 whose other end connects to another vertical conduit, 27. The compensating element 50 compensates for swivel movements, thus flexibly permitting an uninhibited flow between the two conduits 26 and 27. As shown in FIGS. 1 and 2, the far end of the conduit 27 away from the compensating element 50 connects to a condenser 4.

Accordingly, the revolving vessel 2 can freely rotate in its swivel mount 10 around the pivot axis S, thus constituting a pendulum configuration. Therefore, the pivot axis S and the swivel mount 10 could also be referred to as pendulum axis and pendulum mount. In the design examples illustrated, this automatically creates a condition of equilibrium and free rotatability as a function of the fill in the revolving vessel 2, the vessel's dead weight and its resulting buoyancy in the liquid F1.

The revolving vessel 2 dips into a liquid bath 3 containing a liquid FI. The liquid FI acts as a heat transfer medium. It may consist primarily of water or, especially for higher temperatures, of a mineral oil or silicone oil or even of glycol. The inclination of the axis of rotation R relative to the horizontal line H' that extends in a direction orthogonal to the gravitational vector G, describes an angle $\alpha$ while the inclination of the axis of rotation R relative to the vertical line that extends parallel to the gravitational vector describes an angle $\beta$, where $\alpha+\beta=90°$.

As is indicated in FIG. 2, it is also possible to install an damper 55 which, by way of a counterbalance, is solidly connected to the pivot pin of the swivel mount 10 and serves to damper resonant oscillations or imbalances of the revolving vessel 2.

The elbow in the conduit 26 between the two conduit sections 24 and 25 is provided with two fittings for two inlet tubes 32 and 33 which lead into the conduit 26 and through the neck 21 into the receptacle 20 of the revolving vessel 2.

The inlet tube 33 serves as a feed line for feeding the product M to be processed, in particular a liquid substance that is to be concentrated or distilled, into the revolving vessel 2. The tube 33 connects via a valve 14 and another line 36 to a product reservoir 7 that contains the product to be evaporated.

The tube 33 is provided with another in-line valve 13. That additional valve 13 is not absolutely necessary, but it can act as a backup safety device for basic shut-off purposes while generally serving as a permanently open throttle valve with a predefined open operating cross section or diameter.

The valve 14 that is positioned in the product feed path between the tubular line 36 and the tube 33 can be controlled by a controller 17 via a control circuit 37. Functions controllable by the controller 17 include in particular the aperture setting of the valve 14, thus permitting the selectable adjustment of the flow or volume of the product M that travels from the product reservoir 7 through the tubes 36 and 33 and into the revolving vessel 2.

The valve 14 may have two discrete, mutually opposite aperture settings between which the valve 14 can be toggled by the controller 17. However, its aperture settings may also be essentially continuously variable.

In the design version with two preselected, discrete, fixed aperture settings, the valve 14 may simply have a fixed maximum flow setting and a fixed minimum flow setting. In particular, the minimum flow setting may be totally closed, i.e. a zero aperture which altogether prevents any product M from flowing through the valve 14.

It would also be possible to have between a maximum and a minimum aperture setting one or several intermediate flow aperture settings so that, for instance by means of a stepping motor, the valve 14 can be switched between several discrete aperture settings.

For operating the rotary evaporator the liquid bath 3, predominantly containing water as the liquid FI that serves as the heat transfer medium, is set and controlled by a heater, not illustrated, at the desired temperature or temperature profile for the rotary evaporation process concerned.

The drive system 6 is controlled in a manner whereby the revolving vessel 2 is set in motion at a speed so chosen that the rotation of the revolving vessel 2 around the axis of rotation R causes the inner wall of the receptacle 20 to be coated with a thin liquid film of the product M containing the substance(s) to be evaporated. The thermal energy supplied by the liquid FI evaporates from this film of product M the substance, usually the solvent, in controlled fashion and the resulting vapor or gas is channeled through the neck 21, the conduit 26 and the conduit 27 upward to the condenser 4. The film formation substantially broadens the evaporation surface of the product M. The film of product M should be as perfectly even as possible across the entire inner surface of the revolving vessel 2 and it is especially desirable that the film be unbroken and coat or cover as large an area as possible on the inner wall of the revolving vessel 2. That will yield particularly high evaporative efficacy (or evaporation rate) of the rotary evaporator.

Part of the product M will tend to accumulate on the bottom of the revolving vessel 2, meaning that due to gravity a major proportion of the product will drift toward the bottom where it constitutes a supply from which it is drawn by the rotation and the attendant entraining and centrifugal force, aided by the adhesion effect, to form a film of product M on the inner surface of the revolving vessel 2.

The formation of the film on the inner wall of the revolving vessel 2 is a complex process that depends on, and is influenced by, a great many process parameters. These process parameters include first and foremost the amount and the properties of the product M. The physical properties of the product are of particular significance, for instance its viscosity, foaming pattern, or susceptibility to transport conditions (especially in the case of powders, granules or other solids). The properties of the product may also be temperature-dependent, so that the process temperature becomes a factor as well.

One characteristic property of the product M that can negatively affect film formation and evaporation performance is foaming, or foam formation in the revolving vessel 2. The degree of foam formation depends on the type of the product M, the speed at which the revolving vessel 2 rotates, the vacuum in the revolving vessel 2 and the temperature of the heat transfer medium FI. Particularly frothy products include for instance certain polymers and peptides.

To eliminate or at least reduce the foaming problem, the product M is dispensed in controlled fashion at a lower or suitably adapted, dosing rate. The dispensing rate or flow of the product M is appropriately controlled via the valve 14.

Figure 3:
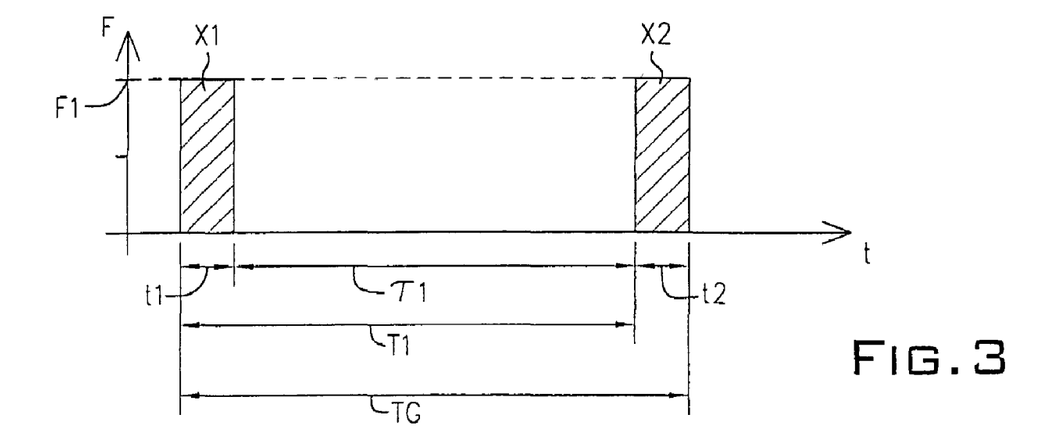
FIGS. 3 and 4 each show two product-feed timing diagrams.
Figure 4:
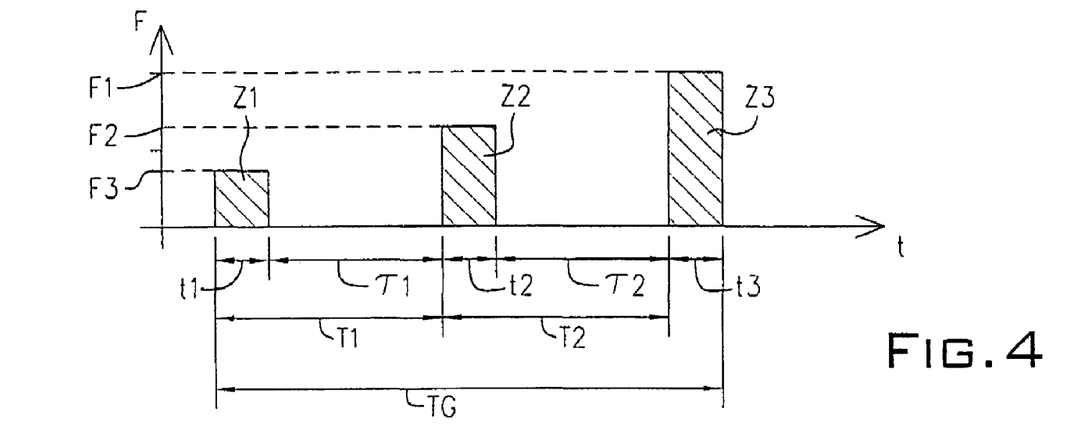

Each of the diagrams in FIG. 3 and FIG. 4 shows examples of how the flow F of the product M through the valve 14 can be controlled as a function of time t. The flow F represents the volume flow per unit of time or the time-based volume derivative as a function of time t.

In the implementation examples according to the two diagrams in FIGS. 3 and 4, the same amount of the product M is introduced in different ways during a total time span, marked TG, of a dosing phase. The total volume introduced is established as a time-based sum or a time-based integral of the flow F over the total duration of time span TG.

In the implementation example per FIG. 3, the intake of the product M is subdivided into two feed pulses X1 and X2 which in this particular case as illustrated in FIG. 3 are square pulses with an identical pulse height F1 corresponding to a constant flow value. The pulse or time lengths are marked t1 for pulse X1 and t2 for pulse X2. In the implementation example illustrated, the pulse lengths t1 and t2 of the two pulses X1 and X2 are identical, i.e. t1=t2. Positioned between the two pulses X1 and X2 is the intervening interval with an interval length of τ1 while no product M is being introduced in the revolving vessel 2. The length τ1 of the intervening interval corresponds to the distance between the two pulses X1 and X2. The distance between the leading edges of the pulses X1 and X2 is marked T1 and in the case of a cyclical sequence of the dosing pulses would correspond to the duration of one cycle. In this case, T1=t1+τ1.

The total duration TG of the dosing phase is now TG=T1+t2=t1+τ1+t2. The total volume of the product M introduced during the dosing phase that extends over the duration TG corresponds to the sum of the two shaded areas of the two pulses X1 and X2 which sum corresponds to the time-based integral of the function F=F(t) over the period with a duration of TG.

In the implementation example per FIG. 4, three dispensing pulses Z1, Z2 and Z3 are generated in the course of the total duration TG of a dosing phase. These pulses are separated by intervening intervals with a duration of τ1 and τ2, respectively. The individual pulse lengths of pulses Z1, Z2 and Z3 are correspondingly marked t1, t2 and t3, respectively. The distance between the leading edges of pulses Z1 to Z3 is identified as T1 for pulses Z1 and Z2, and T2 for pulses Z2 and Z3. Hence, T1=t1+τ1 and T2=t2+τ2, while TG=T1+T2+t3=t1+τ1+t2+τ2+t3.

The pulse height of the last dispensing pulse Z3 in FIG. 4 corresponds to the pulse height F1 that also applies to the two pulses X1 and X2 in FIG. 3. The dispensing pulse Z2 has a lower amplitude representing the flow value F2 and the dispensing pulse Z1 has an even lower flow amplitude representing flow value F3. The F1 to F3 values of the flow F of pulses Z1 to Z3 are selected in a manner whereby the sum of the shaded areas of the pulses Z1 to Z3 in FIG. 4 precisely matches the sum of the shaded areas of the pulses X1 and X2 in FIG. 3.

It follows that during the total time TG of the dosing phase in both implementation examples per FIG. 3 and FIG. 4, the same total amount of product M is fed into the revolving vessel 2, with a difference in the time diagram of the flow volume F over time τ between the two implementation examples per FIGS. 3 and 4. Depending on the nature of product M and/or of the prevailing process conditions, the procedure per FIG. 3 or that per FIG. 4 may be more advantageous for controlling the dosing i.e. dispensing.

All of the time-diagram parameters of the flow F, being a function of time t, can be independently selected, especially the pulse lengths t1 to t3, the pulse intervals τ1, τ2 and the pulse height F1 to F3. For example, in the case of a more effervescent product as compared to a low-foaming product M, the time intervals τ1, τ2 between the dispensing pulses X1 and X2 or Z1 and Z2 or Z2 and Z3 per FIGS. 3 and 4, respectively, are simply extended and/or the pulse height F1, F2 and F3 is reduced.

It is equally possible to repeat, as often as desired, certain pulse sequences such as the sequence of two pulses X1 and X2 per FIG. 3 or the sequence of three pulses Z1, Z2 and Z3 per FIG. 4, until the desired total amount of product M has been imported into the revolving vessel 2. The total duration TG of the intake phase will then be that much longer than that shown in FIG. 3 and FIG. 4, with several pulses generated over the course of the time span TG.

The pulse form or the time-based profile of the pulses X1 and X2 or Z1 to Z3 does not have to be square but may have any form or time pattern for as long as that is essentially reproducible.

The duration of the feed periods such as t1 to t3 will typically be in a range from 0.1 s to 10 s (seconds) but may also be longer or shorter. The duration of the intervening intervals may range from 0 s to several seconds (s), minutes (min.) or even hours (h).

In the implementation examples illustrated, the intervening intervals between the pulses X1 and X2 or Z1, Z2 and Z3 are idle intervals, meaning that the flow of product M is "idle" and essentially no product M is being introduced. It is also possible, however, that during the intervening intervals the flow F and/or the integrated volume of product M does not disappear but takes on a value or a time pattern greater than zero. But in any event, the flow of product M will be less during the intervening intervals than during the feed periods, at least by a factor of 10 and preferably at least by a factor of 20.

In an implementation version not illustrated, the intervening intervals between the pulses X1 and X2 or Z1, Z2 and Z3 may disappear, resulting in a stair-step profile of the flow over time t. A profile of this type can be implemented for instance with a proportional valve that is controlled via a stepping-motor drive system and with a corresponding step-wise opening or closing of the valve aperture.

In the implementation example per FIG. 3 the valve 14 is only switched back and forth between an open state that corresponds to a flow value F=F1, and a closed state where F=0. The opening and closing of the valve 14 by means of the appropriate dispensing pulses can be repeated until a predefined quantity of product M has been loaded into the revolving vessel 2.

In an appropriate form of implementation the desired total amount of product M in the revolving vessel 2 may be preset by way of a suitable control device designed to measure for instance the depth of immersion of the revolving vessel 2 in the liquid bath 3, or the weight of the revolving vessel 2 with the product M contained therein, or the increase in of the entire rotary evaporator or of certain components thereof including the revolving vessel 2. The control device checks whether the revolving vessel 2 contains the desired product amount and, when necessary, regulates that product quantity to a reference variable or setpoint value. This type of control device has been described in the above-referenced publications DE 35 11 981 C2 and DE 35 22 607 A1. For the implementation, monitoring or regulating function controlling the content of the revolving vessel 2, reference is made to these publications and the substance of their disclosure is integrated into the tenor of this present application. The control of the product feed function is thus integrated as an autoleveling servoloop within the control circuitry of the rotary evaporator, with the amount of product M imported being the reference variable and the associated valve 14 serving as the regulating element.

In an alternative form of implementation it is also possible to obtain a count or cumulatively integrated value of the dispensing pulses generated during the dosing phase which permits a calculatory assessment of the amount of product M imported. This may be of particular interest for processes that must be reproducible.

The ratio between the time length t1 to t3 of the dispensing pulses X1 and X2 or Z1 to Z3 and the time length of the intervening intervals τ1, and thus the amount of product M introduced, can be quite easily controlled by opening or closing the valve 14. Such binary control, with the valve being either closed or completely open, is highly reproducible. Moreover, this type of valve is easy to clean. The valve 14 may be controlled for instance by electric, electromagnetic, hydraulic, piezoelectric or pneumatic means.

In the case of a valve 14 with a stepwise variation of the aperture size and corresponding flow profile, that aperture variation for the individual dosing steps essentially prevents dispensing problems associated with otherwise possible valve wear due to product-, viscosity- or temperature-related factors. In particular, it also allows for an operating mode in which the valve 14 is initially closed for a certain time, then slightly opened for another time span, then opened a little more for a while and finally opened all the way for another time period.

How far the valve 14 is opened at any one time essentially depends on the product, the product characteristics, the pressure conditions or the temperature of the product M.

The reduction of the average flow F or dispensing rate and the related timing diagram for the flow can be predetermined on the basis of empirical data or established values of product M and the parameters concerned can be used for the appropriate control settings.

A special design variation provides for the monitoring of foam generation in the revolving vessel 2 for instance by means of optical foam detectors, making it possible via appropriate controls to adjust or regulate the average flow rate of product M or the time-based integral of the flow F as a function of the foaming pattern detected. For example, if foam generation in the revolving vessel 2 increases, one simply extends the time intervals between the dispensing phases and/or shortens the dispensing pulses.

For all of the control processes described, a corresponding control program may be stored in or loaded into the controller 17 and run by a processor in adaptation to the input parameters. Alternatively, self-optimizing control programs may be employed. The controller 17 may be a suitably programmed data processing unit, especially a standard PC.

The condenser 4 includes a heat exchanger 40 by means of which the vapor of the evaporated substance cools off and condenses back into the liquid state. The condensate or distillate is collected in a distillate collector 41 provided on the bottom of the condenser 4 from where it is channeled through a conduit 35 at the lower end of the distillate collector 41, a shut-off device 11, another conduit 31, another shut-off device 12 and another conduit 34 into a distillate collection tank 5.

The shut-off device 12 may be in the form of a three-way valve or cock connecting the conduit 31 not only with conduit 34 but with the tube 32 as well. Depending on the setting of the shut-off device 12, part or all of the distillate flowing from the distillate collector 41 through the conduit 31 can be channeled into the tube 32 and thus back into the receptacle 20 of the revolving vessel 2. If the other shut-off device, 11, is closed, it will cause the distillate collector 41 of the condenser 4 to be flooded and the distillate, now no longer draining off via conduit 35, will flow via the vapor conduit, i.e. conduits 27 and 26 which together with the neck 21 serve as the return-flow system, directly back into the receptacle 20 of the revolving vessel 2. This results in improved self-cleaning of the vapor tract.

In normal cases the product M emanating from the product reservoir 7 and fed into the receptacle 20 of the revolving vessel 2 contains at least two components with different boiling points or evaporation temperatures. Consequently, only the one substance or component having the lower boiling point will vaporize in the rotary evaporation process, leaving the substance(s) with the higher boiling point behind in the revolving vessel 2. This makes possible a concentration or distillation of the product or a distillation of the solvent.

REFERENCE NUMBERS AND SYMBOLS

2 Revolving vessel
3 Heat transfer bath (thermal bath)
4 cooler, condenser
5 Distillate collection tank
6 Drive system
7 Product reservoir
8 Housing
9 Bracket assembly
10 Swivel mount
11, 12, 13, 14 Valves
17 Regulating device and/or controller
20 Receptacle
21 Neck
22 Connecting flange
23 Intake assembly
24, 25, 26 Conduit sections
31 to 36 Tubular conduits
37 Control circuit
40 Heat exchanger
41 Distillate collector
50 Compensating element
55 Attenuator, damper
58 Base plate
59 Sleeve-type shaft
Fl Liquid
G Gravitational force
H' Horizontal line
R Axis of rotation
S Pivot
α, β Angles
X1, X2 Feed/dispensing pulses
Z1, Z2, Z3 Feed/dispensing pulses
t1, t2, t3, τ1, τ2 Time durations
T1, T2 Time durations
TG Total time duration
F1, F2, F3 Pulse height
F flow
t Time
M Product

What is claimed is:

1. Method for evaporating at least one substance wherein
   a) during at least one dosing phase (TG) importing a predefined or predefinable quantity of a product (M), which comprises at least one substance that evaporates, via a feed system (7, 14, 17, 33, 36) into a revolving vessel (2), b) rotating the revolving vessel around an axis of rotation (R), and c) generating or maintaining appropriate process conditions for the evaporation of the at least one substance, whereas:

the feed system (14, 17) automatically controls or regulates a flow (F) of the product (M) during the dosing phase (TG) as a function of at least one process parameter and/or of at least one characteristic property of the product, the product (M) is imported into the revolving vessel (2) in the course of the dosing phase only during predefined feed periods interrupted by intervening intervals, the flow or imported quantity of the product is less during the intervening intervals than during the feed periods and is essentially zero during the idle intervals, and whereby a function of the formation of foam in the revolving vessel controls or regulates the flow during the dosing phase.

2. Method as in claim 1, in which time-related profiles of the flow (F) of the product (M) are essentially mutually identical for all feed periods.

3. Method as in claim 1, in which the time-related profiles of the flow (F) of the product (M) are mutually different for at least two feed periods.

4. Method as in claim 1, in which the flow (F) is essentially constant during at least one feed period and over an entire duration of the feed period.

5. Method as in claim 1, whereby during at least two of the feed periods the quantities of the product (M) imported in the course of the entire duration of the feed periods are mutually different.

6. Method as in claim 1, in which time lengths of at least two feed periods are mutually different.

7. Method as in claim 1, in which the time lengths of the feed periods are essentially identical to one another.

8. Method as in claim 1, in which time lengths of the intervening intervals between the feed periods are essentially identical to each other.

9. Method as in claim 1, in which time lengths of at least two of the intervening intervals between the feed periods are mutually different.

10. Method as in claim 1, whereby a time-related profile of the flow (F) of the product (M) is modified during the dosing phase.

11. Method as in claim 1, whereby the total quantity of the product (M) contained in the revolving vessel (2) is determined and the amount of product imported per dosing phase is controlled on the basis of said determination of the total product quantity.

12. Method as in claim 1, whereby the product quantity imported into the revolving vessel during a predefined time span is determined by time summation or integration.

13. Method as in claim 1, in which the revolving vessel rotates around a pivot and a pivoting angle of the revolving vessel relative to a reference position determines the product quantity imported during the dosing phase.

14. Method as in claim 1, whereby at least one process parameter and/or at least one characteristic property of the product is automatically determined and the product flow during the dosing phase is controlled or regulated as a function of the process parameter and/or characteristic product property thus determined.

15. Method as in claim 1, whereby the revolving vessel (2) is rotated in a heat transfer bath (FI) and in the process is heated to a temperature that is needed to vaporize the substance(s) to be evaporated.

16. Method as in claim 1, in which the time duration of the feed periods and/or of the intervening intervals is modified during the intake phase.

17. Method as in claim 1, wherein the flow or imported quantity of the product is less during the intervening intervals by at least a factor of 10 than during the feed periods.

18. Method as in claim 1, wherein the flow or imported quantity of the product is less during the intervening intervals by at least a factor of 20 than during the feed periods.

* * * * *